Figures 1, 2:
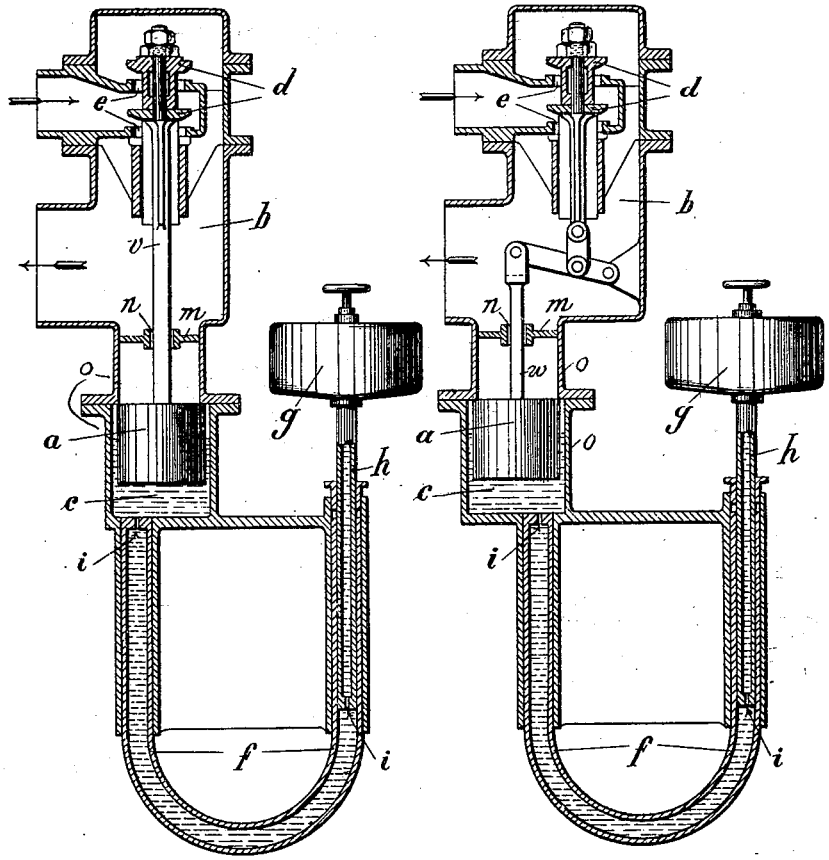

No. 682,085. Patented Sept. 3, 1901.
F. KAEFERLE.
PRESSURE REDUCING APPARATUS.
(Application filed May 10, 1901.)

(No Model.)

Witnesses

Inventor
Fritz Kaeferle
by his Attorney

UNITED STATES PATENT OFFICE.

FRITZ KAEFERLE, OF HANOVER, GERMANY.

PRESSURE-REDUCING APPARATUS.

SPECIFICATION forming part of Letters Patent No. 682,085, dated September 3, 1901.

Application filed May 10, 1901. Serial No. 59,713. (No model.)

*To all whom it may concern:*

Be it known that I, FRITZ KAEFERLE, a subject of the German Emperor, residing and having my post-office address at Luerstrasse 3, Hanover, Germany, have invented certain new and useful Improvements in or Relating to Pressure-Reducing Apparatus, of which the following is a specification.

The present invention relates to pressure-reducing apparatus.

In the annexed drawings, Figures 1 and 2 are vertical sections of two forms of construction.

The pressure of the pressure agent passing through the said apparatus is reduced or regulated by the rising and falling of a float $a$, which dips into liquid $c$, closing the pressure-chamber $b$, and thus more or less opens or closes a double-beat valve which has conical faces $d$ or seats $e$ of exactly or approximately equal diameter and is therefore balanced. As is known in such apparatus, the rising and falling of the float $a$ corresponds to the extent to which the liquid $c$ is forced through the siphon $f$ into the adjustable vessel $g$ by the overpressure occurring in the chamber $b$. In setting the valve or adjusting the apparatus for different reduced pressure or on the occurrence of sudden changes in the pressure in chamber $b$ the surface of the liquid receives each time a more or less frequent rising-and-falling motion, which causes the valve to strike and beat, so that if the double-beat valve is not sufficiently shut off the liquid $c$ is frequently thrown by overpressure out of the siphon $f$ and the vessel $g$. To counteract this, the movement of the liquid $c$ must be retarded to such an extent that on change of pressure occurring in the apparatus the movement of the float $a$, and therefore of the double-beat valve $d$, is distributed over a period which is longer than that of the sudden change of pressure. This result might be obtained by making the inner diameter of the siphon so small that the movement of the liquid in the float vessel would be sufficiently slow; but this would greatly increase the friction of the liquid $c$ in the narrow siphon $f$ and would, more particularly in apparatus for high pressure, in which the siphon is very long, create resistances which would very much deteriorate the normal action and the sensitiveness of the apparatus. Further impurities entering the siphon would be very liable to block same and difficult to remove. For these reasons it is necessary that the siphon $f$ should be of sufficiently large diameter. By the present invention the necessary retardation of the motion of the liquid is effected by reducing in diameter or constricting the uniformly-wide siphon $f$ at one or more points $i$—for instance, at the end thereof—in the float vessel, the width of such reduced parts or constrictions being such that the required retardation of the motion of the liquid is produced in consequence of the displaced liquid having to pass through the said reduced parts. The same result is obtained by reducing in diameter the tube $h$ of the vessel $g$—for instance, at the lower end of the said tube—or, as shown in the drawings, such constrictions can be arranged at both places.

In large apparatus through which steam must pass with great speed for a long time before it has filled the pipes beyond the apparatus sufficiently to retard its speed it frequently happens that the steam carries away part of the liquid $c$ from the vessel $o$, so that the action of the apparatus is considerably affected. In such case the valve $d$ cannot open sufficiently, since the float $a$ descends immediately the quantity of liquid $c$ is reduced. Consequently the required quantity of steam does not pass to the pipes beyond the apparatus and the desired pressure is not obtained. To prevent this, the vessel $o$, containing the liquid, is provided with a partition $m$ below chamber $b$, and the valve-rod $v$, Fig. 1, or the lever-rod $w$, Fig. 2, passes through the opening $n$ in the said partition. The said opening $n$ is just sufficiently large to allow of the equalization of pressure between vessels $g$ and $o$. The effect produced by this arrangement is the same as that of the constrictions $i$—that is to say, the equalization of pressure is retarded, but the free space surrounding the rods $v$ or $w$ is so small that the steam or other fluid cannot carry away any portion of the liquid $c$ from vessel $o$ to the pipes. The action of a pressure-reducing apparatus provided with the partition $m$ can therefore not be interfered with by great and continued energy of the steam or other fluid.

I declare that what I claim is—

1. In a pressure-reducing apparatus having a double-beat valve and a float connected therewith which float is movable in a float vessel, the combination of a siphon connected with an adjustable vessel, the said siphon having constrictions at one or more points for the purpose of checking the motion of the liquid in the siphon on the occurrence of sudden fluctuations of pressure substantially as described.

2. In a pressure-reducing apparatus having a double-beat valve and a float connected therewith which float is movable in a float vessel, the combination of a siphon connected with an adjustable vessel, the said siphon having constrictions at one or more points, and a fixed partition in the float vessel, said partition being provided with an opening for the passage of the valve-rod for the purpose of preventing overflow of liquid from said float vessel into the pipes beyond the apparatus substantially as described.

In witness whereof I have signed this specification in the presence of two witnesses.

FRITZ KAEFERLE.

Witnesses:
C. C. STEVENSON,
CARL RAHLFS.